United States Patent [19]

Foster

[11] 4,260,171
[45] Apr. 7, 1981

[54] BICYCLE HANDLEBAR ADJUSTMENT ASSEMBLY

[76] Inventor: Edwin E. Foster, 1801 Camp Craft Rd., Austin, Tex. 78746

[21] Appl. No.: 1,443

[22] Filed: Jan. 8, 1979

[51] Int. Cl.³ .................... B62K 21/22; B62D 1/18; G05G 5/06
[52] U.S. Cl. .................... 280/279; 74/493; 74/527; 74/551.3; 403/108; 403/322; 403/328
[58] Field of Search ............. 280/278, 279; 74/493, 74/527, 551.3; 403/108, 322, 328

[56] References Cited

U.S. PATENT DOCUMENTS

| | | | |
|---|---|---|---|
| 3,260,535 | 7/1966 | Jaulmes | 280/279 |
| 3,306,127 | 2/1967 | Rieger | 74/493 |
| 3,491,663 | 1/1970 | Morgan | 74/493 |
| 3,933,373 | 1/1976 | Gammelgaard | 280/278 |

FOREIGN PATENT DOCUMENTS

| | | | |
|---|---|---|---|
| 203007 | 6/1939 | Switzerland | 74/551.3 |
| 9124 | of 1896 | United Kingdom | 280/278 |

*Primary Examiner*—Allan D. Herrmann
*Attorney, Agent, or Firm*—Kalish & Gilster

[57] ABSTRACT

A handlebar height adjustment assembly for a bicycle for use with a bicycle having a vertically presented head tube, a stem, and with handlebars engaged to said stem comprising a vertically presented stem tube engaged to the upper portion of the stem and projecting downwardly into a head tube for axially reciprocal shiftable movement relative to the head tube. The stem contains a passage communicating with the interior of the stem tube, with there being a control rod extending downwardly through the stem passage and into the stem tube. A fork tube surrounds the stem tube and is fixed against relative rotative movement with respect to the stem tube; a latch member interengages the control rod and the stem tube for joint shiftable movement thereof and with the latch member being selectively engageable with the fork tube through shifting of the control rod for presenting and maintaining the handlebars in predetermined vertical relationship with respect to the head tube.

3 Claims, 21 Drawing Figures

BICYCLE HANDLEBAR ADJUSTMENT ASSEMBLY

BACKGROUND AND SUMMARY OF THE INVENTION

This invention relates in general to bicycles and, more particularly, to gear shifting systems therefor which do not necessitate removal of the rider's hands from the handlbars to effect operation.

Heretofore, current multi-speed bicycles, such as the usual ten-speed, have disposed operating levers for shifting gears in such a manner upon the bicycle frame as to require the rider to remove a hand from the handlebar for manipulation thereof. One very common location for such gear shift levers is in the upper region of the front diagonal of the bicycle frame; while another is at the extremities of the handlbars. A third customary location is upon the post or stem. But all such locations necessitate the user's withdrawing one hand from the handlebars with consequent diminution in control of the bicycle in order to bring about the intended gear ratio. Also with each of said gear shifter positions, operation causes the rider, at least momentarily, to divert his gaze from the road ahead with attendant potential hazard. Regrettably, many avoidable accidents have occured during the shifting interval by reason of the bicycle striking some undetected obstacle, such as a pothole or other obstruction in the road while the rider is distracted with shifting. Too often injury results.

Until most recently, handlebars on multi-speed bicycles were provided with hand controls for the usual caliper brakes. The effective operation of such hand controls militated against mounting gear shifting means on the handlebars. However, in my pat., No. 4,030,774, issued June 21, 1977, I disclosed a system for pedal-actuation of bicycle brakes on multi-speed bicycles, thereby obviating the need for a rider to utilize his hands for braking action and, accordingly, to reduce the use of hands for other than bicycle steering. Also of interest with respect to pedal-actuated brakes for bicycles of such type is the structure set forth in my co-pending application, Ser. No. 937,465, filed Oct. 13, 1978. Thus, by my said inventions, the handlbars are liberated from the need to support hand brakes and, therefore, with resultant availability for mounting gear shifting systems directly thereon.

In providing gear shifting mechanisms on the handlebars, consideration should be taken of the fact that handlebars may be of various configurations, with the two most popular being of the racer or dropped type wherein the end portions, often called "drops", are curved downwardly and rearwardly, and of the touring type wherein the end sections of the handlebars may project outwardly and, if desired, rearwardly and/or upwardly; as well as of the fact that riders often times have individual preferences with respect to the zone for gripping handlebars. With racer handlebars individuals may generally grip the upper central part of the handlebars and merely grip the "drops" for a change of pace or an extra power spurt. Similarly, with touring handlebars, a rider may shift his hand position from the ends to the central horizontal portion, and thence back and forth.

Accordingly, it is an object of the present invention to provide a system for multi-speed bicycles for effecting gear shifting which is mountable upon the handlebars and the operation of which does not obligate the rider to remove either hand from the handlebars so that full dirigibility is at all times maintained, as well as appropriate bracing for braking action.

It is another object of the present invention to provide a gear shifting system of the type stated which is so uniquely constructed of coacting components that the operation thereof does not require the rider to divert his gaze from the road ahead during gear shifting.

It is a still further object of the present invention to provide a bicycle gear shifting system of the type stated which is adapted for utilization on various configurations of bicycle handlebars and which, in addition, is suitably adapted for facile manipulation by the rider consonant with the rider's peculiar predilection for hand location upon the handlebars.

It is a still further object of the present invention to provide a bicycle gear shifting system of the type stated which permits comfortable, yet reliable, gripping by the rider and with the operation thereof being simply and non-strenuously effected.

It is another object of the present invention to provide a gear shifting system of the type stated which is extremely versatile in usage, being adapted for use with various multi-speed bicycles, including, by way of example, those provided with the current, popular front freewheeling systems, whereby the present invention may be applied upon existing bicycles without necessitating costly installation or structural modifications.

It is a further object of the present invention to provide a bicycle gear shifting system of the type stated which is constructed of a simplicity of parts; which may be manufactured and installed in a most economical fashion; which promotes increased safety for the rider; and which is durable and reliable in usage.

It is another object of the present invention to provide a system for effecting facile elevation of the handlebar-supporting stem during bicycle operation; which system may be easily mounted upon existing bicycles.

The present invention comprises, in essence, a sleeve-forming member mounted upon each side portion of a bicycle handlebar for rotative movement thereabout; with each such sleeve-forming member at its inner or stem-proximate end being operatively engaged with the end of an associated cable; one of such cables carries detents for effecting selective engagement of the rear chainwheels or sprockets which are provided in the usual cluster of five mounted upon the rear axle; and the other such cable leading to the front chainwheel or sprocket wheel assembly for effecting engagement of the particular one. By mere turning of the particular sleeve-forming member about the handlebars, through the requisite angle, forwardly or rearwardly as the case may be, the desired gear ratio may be established without the user having to remove either hand from controlling disposition upon the handlebar and without the need of visually observing such operation since a sense of "feel" will indicate the gear engagement. The customary levers mounted upon portions of the bicycle frame such as the front diagonal, the stem, or the like is obviated by the present invention; and with the brakes being pedal-actuated, a rider using the present invention is at all times in full command of the bicycle.

DESCRIPTION OF PRACTICAL EMBODIMENTS

Figures 1, 2, 6:
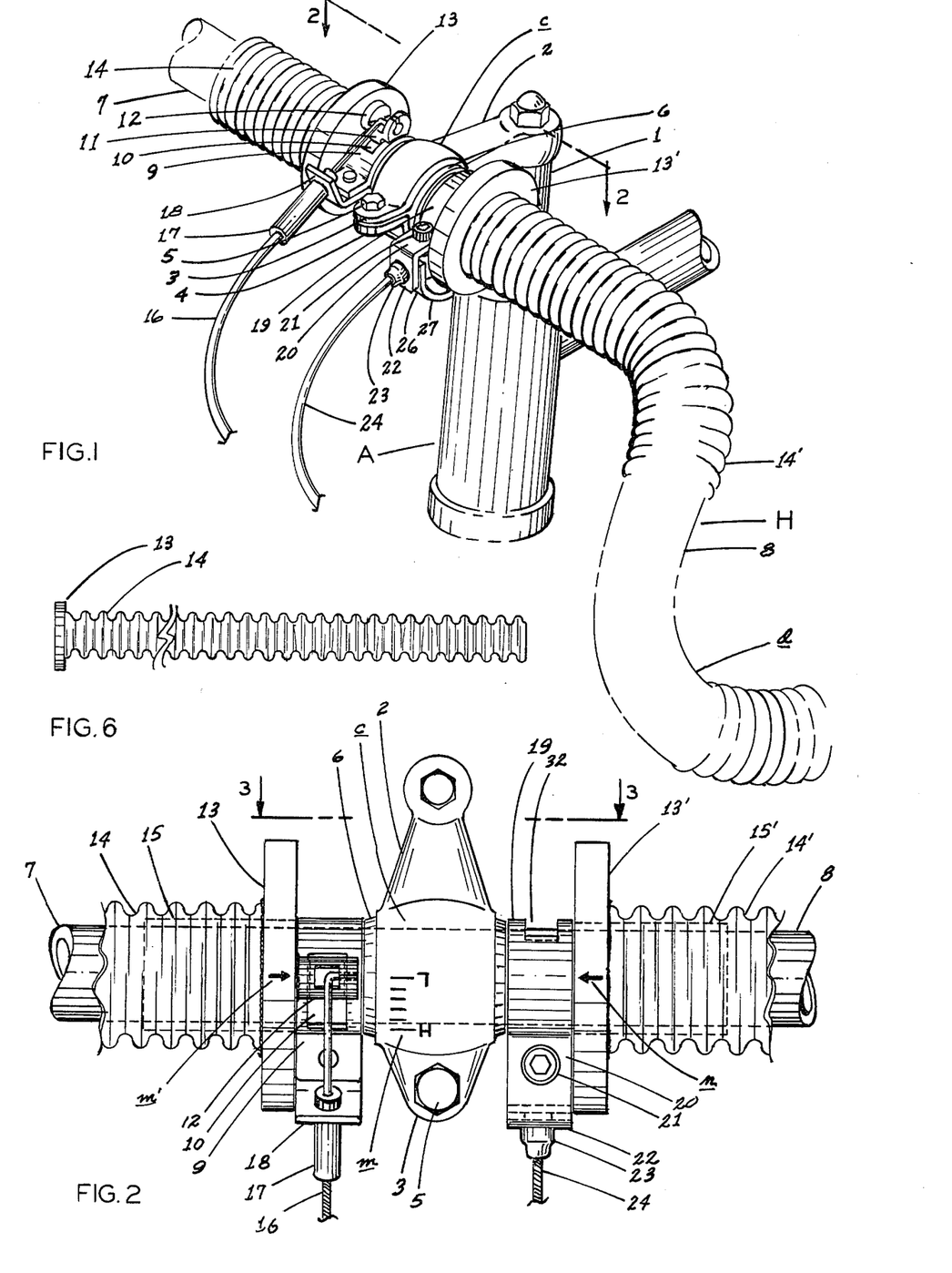
FIG. 1 is a fragmentary perspective view of bicycle handlebars having mounted thereon a gear shifting system constructed in accordance with and embodying the present invention.
FIG. 2 is a top plan view taken on the line 2—2 of FIG. 1.
FIG. 6 is an elevational view of the torsion sleeve in unmounted condition.
Figure 3:
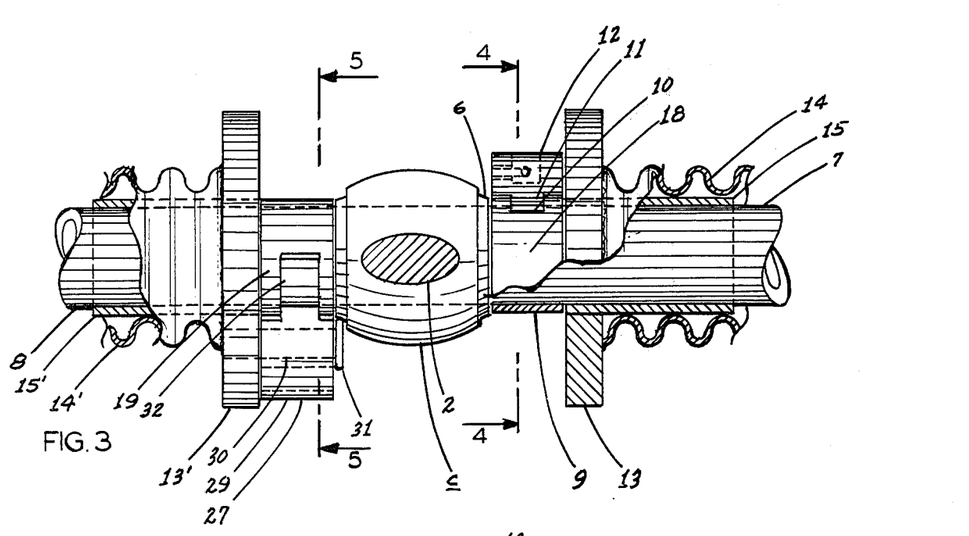
FIG. 3 is a rear elevational view, in partial section, taken on the line 3—3 of FIG. 2.
Figure 4:
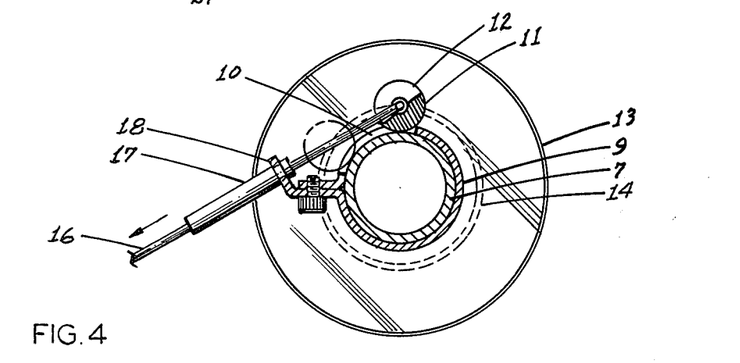
FIG. 4 is a vertical transverse sectional view taken on the line 4—4 of FIG. 3.

Referring now by reference characters to the drawings which illustrate practical embodiments of the present invention, A designates the post of the frame of a conventional bicycle having the usual stem 1 mounted thereon; upon which latter at its upper end is provided a forwardly extending arm 2 terminating in a two-part collar or clamp c having cooperating members 3, 4, mutually securable by a bolt 5, for embracing the central enlarged portion 6 of racer type handlebars H. Said handlebars H progress laterally outwardly from each side of the central portion, as at 7, 8, respectively, and thence downwardly and rearwardly to present the usual "drop" as at d. Fixed upon portion 7 of handlebars H immediately adjacent collar c is an annular clamp 9 having a slot-like aperture 10 formed in its wall portion for receiving the slide-forming or lower portion 11 of a boss 12 projecting laterally inwardly, or toward collar c, from an enlarged disc 13 provided at the inner end of a torsion sleeve 14, as of corrugated character, enclosingly disposed upon the said portion 7 of handlebar H and the adjacent "drop". Thus, the interengagement of slide-forming portion 11 and aperture 10 effects reliable securement of sleeve 14 to clamp 9 so that untoward, accidental displacement of sleeve 14 from handlebars H is obviated.

Torsion sleeve 14 is preferably of molded construction, being formed of a suitable plastic to provide requisite flexibility for ease of encasing the related portion of handlebars H and with disc 13 being integral therewith. As shown in FIG. 6, torsion sleeve 14 is normally rectilinear, but through its flexibility, and corrugated nature, may be easily slipped onto handlebars H. To facilitate acceptance of sleeve 14 and disc 13 upon handlebars H is a bearing 15 of split-sleeve character so that the components thereof may be placed about handlebars H prior to slipping disc 13 thereover.

Suitably secured within disc boss 12 is one end of a push-pull cable 16 which extends forwardly through a short, rigid sleeve 17 held within a flange 18 integrally formed with clamp 9; said cable 16 progressing downwardly and rearwardly in the usual manner to the rear friction freewheel or chainwheel assembly (not shown) and having five detents (not shown) for locating the five sprockets of such assembly. Such means of interengagement with the rear sprockets is conventional and does not form a part of the present invention, which latter fundamentally resides in the provision of means for operating the controlling gear shifter cables without the necessity of the rider removing a hand from handlebars H. As will be observed, in FIG. 2, collar c in its upper surface, in predetermined registration with aperture 10, is provided with a series of indicator marks m from "H" (high gear) to "L" (low gear) corresponding to the five gear positions attainable by sprockets of the rear chainwheel assembly (not shown) through travel of slide member 11 within aperture 10. The rider can actually "feel" the detents (not shown) as sleeve 14 is turned from "L" to "H" and back so that his gaze need not be averted from the road during shifting; said marks m being merely for ready reference, if desired. Accordingly, it will be seen that the rider can cause shifting with respect to the rear gears by merely twisting, turning, or applying requisite torque upon sleeve 14 to move slide 11 within aperture 10 the angular distance needed for shifting to engage the particular sprocket of the rear chainwheel assembly for bringing about the intended ratio. Disc 13 carries on its peripheral edge a suitably inscribed marker m', such as an arrow, for alignment with slide 11 to allow of ease of determination of the position of slide 11 through alignment of marker m' and the related mark m.

Figure 5:
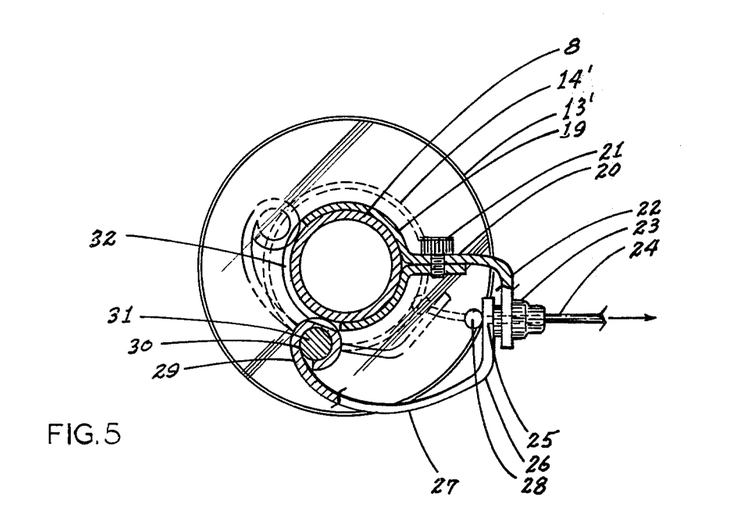
FIG. 5 is a vertical transverse sectional view taken on the line 5—5 of FIG. 3.

Disposed upon the portion 8 of handlebars H is a torsion sleeve 14' which is of like construction and character as sleeve 14 above described, and is provided with an enlarged, integrally formed disc 13' of like construction as disc 13; there being a split sleeve 15' engaged upon handlebar H for facilitating mounting of sleeve 14' thereon. Rigid on handlebars H in the intervening space between disc 13' and collar c is a clamp 19 which characteristically comprises registering flanges 20, 20' having aligned tapped openings for receiving a retaining screw 21; with flange 20 projecting forwardly of flange 20' and thence downwardly to present an extension 22 which latter is apertured for accepting a support sleeve 23 for a tension or push-pull cable 24. The proximate end of cable 24 passes through an opening 25 at the upturned forward end 26 of a link 27 and with there being an enlarged head or detent 28 carried upon the end extremity of cable 24 for maintaining engagement with link 27. Link 27, extending rearwardly from forward end 26, is curvate with its upper rearward end 29 being turned upon itself to form an eyelet 30 receiving a pin 31 projecting from the adjacent face of disc 13'; thereby establishing positive engagement between link 27 and sleeve 14'. The normally upper portion of eyelet 30 projects into a slot-like opening 32 formed in clamp 19 which extends from the lower central portion of the side wall thereof to the upper rearward portion; said opening 32 being of such arcuate extent as to permit travel of curved link 27 between low gear position, as shown in full lines in FIG. 5, and high gear position as shown in phantom lines in said FIG. 5. Therefore, by means of the turning of torsion sleeve 14', shifting the bicycle drive chain (not shown) between the customary two sprocket wheels which constitute the front chainwheel assembly may be easily effected. It is to be observed that in moving from low gear to high gear position and vice-versa with commensurate pulling or pushing of cable 24, curved link 27, in the manner of a spring, passes over-center and thus will be stable in each gear position with reliability being assured and any inadvertent, unauthorized shifting being inhibited.

Disc 13' carries on the peripheral edge thereof a suitably inscribed mark n, such as an arrow, for alignment with marks "L" and "H" as provided on collar c for indicating the particular state of cable 24; that is whether the front chainwheel assembly is in low gear or high gear position. It will therefore be seen that the travel of pin 31 between low and high gear position is of the same extent as the travel of slide 11 between such gear positions.

As pointed out hereinbefore, the present invention is particularly adapted for utilization with bicycles equipped with pedal-actuated brakes such as set forth in U.S. Pat. No. 4,030,774 and as described in my co-pending patent application Ser. No. 937,465, since any need for removing the hands from the handlebars is entirely eliminated, whether it be for brake control action or for gear shifting purposes. To the present time all bicycle gear shifting systems have required the rider to remove at least one hand from the handlebars so that complete control of the bicycle is momentarily lost with the result that any unforeseen emergency during such juncture, whether it be encountering a pothole, chuckhole, sand, rut, or other road obstacle which could be most hazardous, and especially in view of the fact that with only one hand on the handlebars the rider is not suitably braced if braking action is indicated. Heretofore, such has been an accepted peril of bicycle gear shifting, as the rider must take his eyes from the road and one hand from the handlebars to effect such operation. With the present invention, the rider will not remove either hand from the handlebars and by merely appropriately twisting or turning the related sleeve 14 or 14', as the case may be, or sequentially, brings about the desired gear ratio.

Accordingly, the present invention adds a safety factor to multi-speed bicycles which has been uniformly absent since the inception thereof. It may additionally be seen that the components of the present system are relatively simple and that such may be easily and cheaply installed upon existing bicycles. Of signal importance is the fact that the present invention does not require the rider to grasp the handle bars in any novel, uncomfortable or awkward fashion, but rather permits freedom to grip the same in any manner that may be desired, whether at the outer ends or in the center, or intermediate zones, and yet be able to effectuate gear shifting. Similarly, the design of the handlebars is without consequence as the present invention operates equally efficiently with racing or touring handlebars—with the former having been described hereinabove solely for expository purposes.

Figure 7:
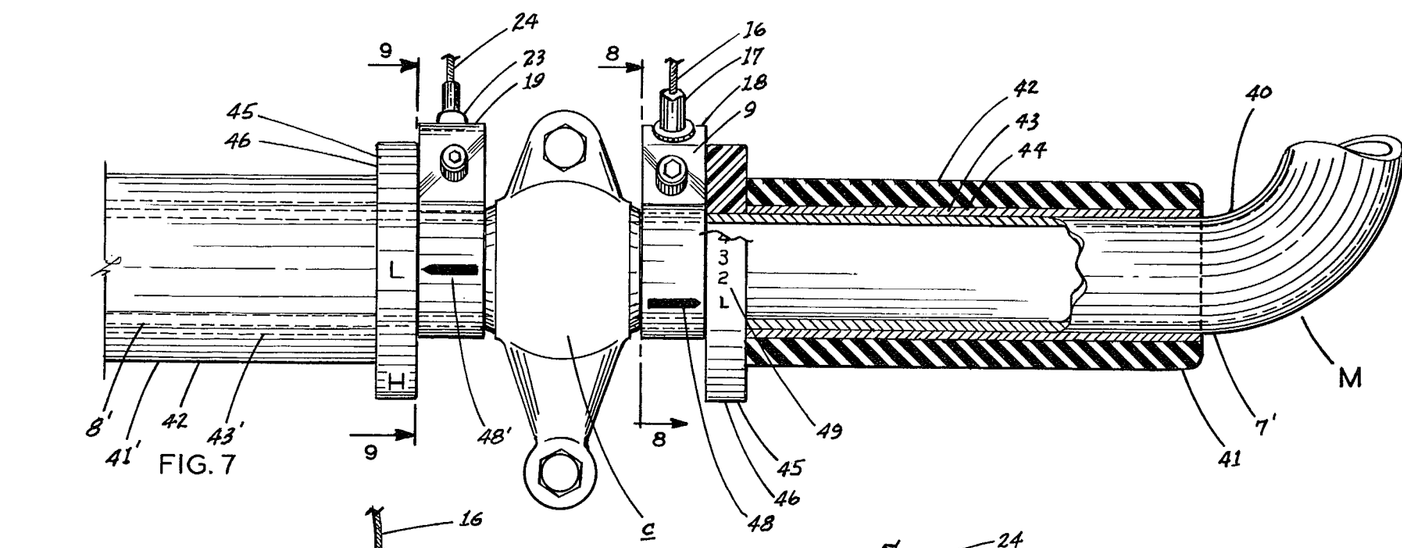
FIG. 7 is a fragmentary top plan view, in partial section, of bicycle handlebars having mounted thereon another form of bicycle gear shifting system constructed in accordance with and embodying the present invention.
Figure 8:
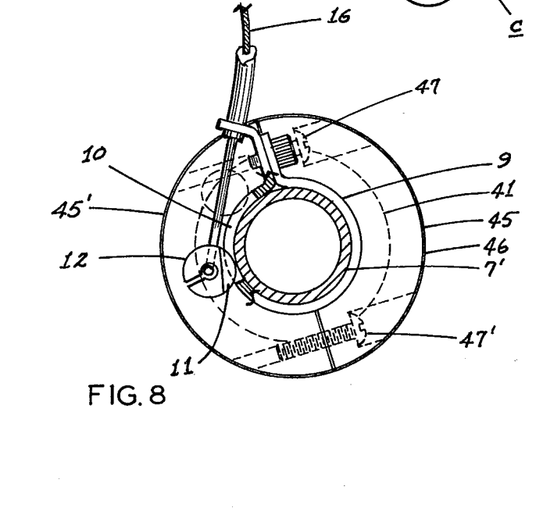
FIG. 8 is a vertical transverse sectional view taken on the line 8—8 of FIG. 7.
Figure 9:
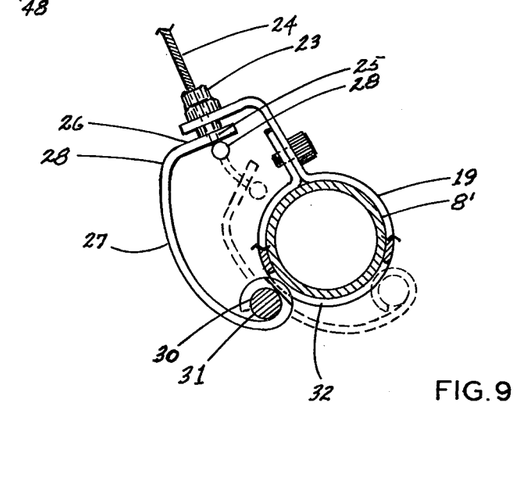
FIG. 9 is a vertical transverse sectional view taken on the line 9—9 of FIG. 7.

Referring now to FIGS. 7, 8 and 9, another form of gear shifting system is illustrated which incorporates essentially the same components as described in conjunction with the system shown in FIGS. 1 to 6 and described hereinabove so that like members will be accorded the same reference letter or numeral, as the case may be, for facilitating comprehension. However, the primary distinction resides in provision of relatively short torsion sleeves which are engaged about the central portion of the handlebars and having the added general character of the usual cushion grips. Handlebars M may be of general racing configuration so that the same is arcuated, as at 40, into "drop" formation spacedly from stem collar c with the intervening portions 7', 8' thus being substantially rectilinear, upon which are disposed torsion sleeves 41, 41' respectively.

Sleeves 41, 41' are of composite or assembly character, each comprising a tubular member 42, as constructed of foam rubber and being of limited length as compared to the full length sleeves 14, 14' above described, so as to merely embrace portions 7', 8' of handlebars M. Each tubular member 42 is disposed upon cooperating components 43, 43' of a split-sleeve bearing 44 tightly engaging handlebar M, which bearings 44 at the inner or stem-adjacent ends thereof, are respectively integrally formed with semi-annular elements 45, 45' of a disc 46 of the same general character as disc 13 described above, except for the obvious split nature thereof. Each bearing 44 and the associated disc 46 is preferably formed of nylon or similar sturdy material and with the bearing components 43, 43' and disc elements 45, 45' being snugly united in operative position by screws 47, 47', which are engaged within aligned, tapped countersunk openings formed in the said disc elements 45, 45' (see FIG. 8). It will thus be seen that tubular members 42 are closely disposed about the normally outer face of the related bearing 44 to bring about such frictional engagement that turning or twisting of members 42 will be transmitted to the associated bearings 44 and hence to the related discs 46 for effecting operation of the associated cable 16 or 24 as the case may be.

Projecting inwardly from the stem-confronting face of disc element 45' of disc 46 of sleeve 41 is a boss 12, an edge portion of which constitutes a slide 11 receivable in a slot-like aperture 10 formed in clamp 9; with push-pull cable 16 being secured to boss 12, all in the manner hereinabove described with respect to the embodiment shown in FIGS. 1 to 6 inclusive, but with the exception that clamp 9 is so positioned on handlebar M that aperture 10 is directed downwardly rather than upwardly but merely for cosmetic purposes. On the upper face of clamp 9 there is a transversely presented marker 48 for coordination with graduate markings 49 suitably inscribed on the periphery of the adjacent disc 46 for indicating the positions of slide 11 within aperture 10 corresponding to rear gear sprocket conditions as "L" (low), 2, 3, 4, and "H" (high). Accordingly, the operation of sleeve 41 brings about requisite shifting so as to engage the desired chainwheel of the rear chainwheel assembly.

Disc 46 of sleeve 41' is interengaged to curved link 27 by a pin 31 extending from its inwardly directed face and hence to tension cable 24 through clamp aperture 32 in the manner hereinabove described in conjunction with the embodiment shown in FIGS. 1 to 6 inclusive for effecting high gear and low gear positioning of the drive sprockets or so-called front chainwheels. Clamp 19 has suitably inscribed on its upper surface a marker 48', as in the nature of an arrow, for alignment with letters "L" and "H" carried on the periphery of the adjacent disc 46 for demonstrating the selected gear condition.

Referring now to FIGS. 10-13 inclusive, another form of bicycle gear shifting system embodying the present invention is illustrated wherein T designates bicycle handlebars constructed of the usual tubular stock and formed into what is popularly known as the touring configuration wherein the end portions are not dropped. Disposed on each end of handlebars T is a sleeve 51, only one of which is shown in the drawings for purposes of exposition; said sleeve 51 being in the character of a conventional hand grip and preferably of molded plastic construction. Each sleeve 51 comprises an outer side wall 52 having an inside diameter for suitably fitting upon the engaged handlebar portion. Each sleeve 51 embodies an end closure head 53, the inner surface of which abuts against the proximate edge of handlebars T, as at 54. Centrally, head 53 is integral with an extension 55 of substantially like length as outer wall 52 but being of relatively reduced diameter with respect to the inside diameter of the surrounding handlebar portion for uninhibited reception within the latter. Milled or otherwise provided in handlebars T adjacent the outer ends thereof is a circumferentially extending slot-like aperture 56, approximately 180° in extent, through which projects the stem 57 of a limit screw 58, the head of which is accepted within a countersink within sleeve outer wall 52 and with the inner end portions of said screw 58 being secured within registering openings as at 59, 59' in extension 55 on opposide sides of a central weight-reducing bore 60; said latter terminating spacedly from the inner end of extension 55 (see FIG. 11). Thus, sleeves 51 are so disposed upon handlebars T as to permit turning thereabout through the application of sufficient torque but with the angle of rotation being restricted by reason of abutment of limit screw 58 against the end-forming surfaces of aperture 56.

Suitably fixed within a recess 61 provided in the inner end portion of extension 55 is a connector head 62, as of metal, for securement to the outer end of a flexible shaft 63 whereby the rotation of the latter is controlled by manipulation of the associated sleeve 51. Each shaft 63 progresses inwardly within the associated portion of handlebars T for engagement at the opposite or inner end thereof to a similar connector head 64. Each head 64 is adapted at the inner end thereof to engage the outer end of a straight, rigid shaft 65, the opposite end of which is journaled within a stationary bearing 66 fixed within the central enlarged portion of handlebars T as at 67 (see FIG. 10).

Figures 10, 11, 12, 13:
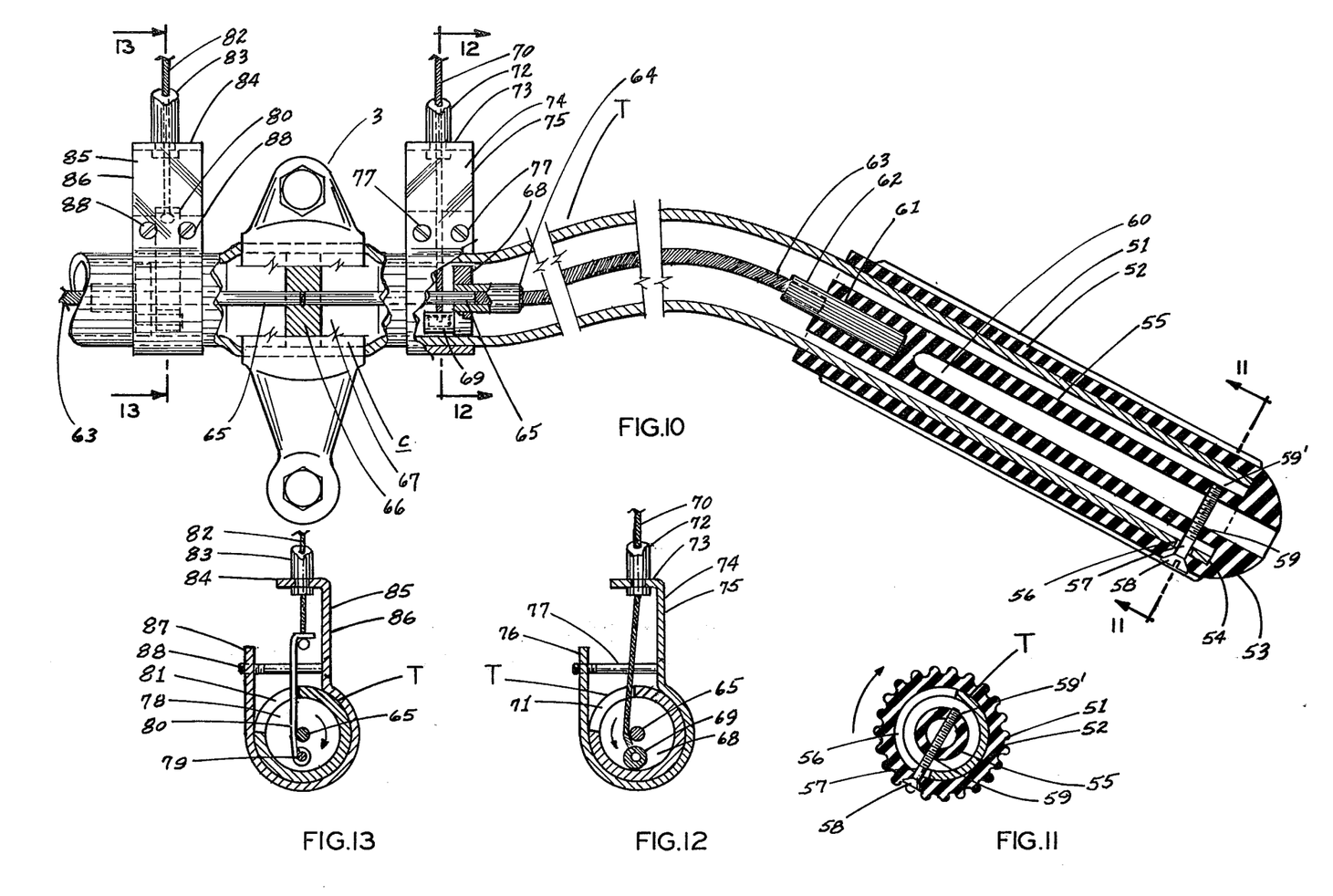
FIG. 10 is a fragmentary top plan view, in partial section, of bicycle handlebars of touring configuration having mounted thereon a further form of gear shifting system constructed in accordance with and embodying the present invention.
FIG. 11 is a vertical transverse sectional view taken on the line 11—11 of FIG. 10.
FIG. 12 is a vertical transverse sectional view taken on the line 12—12 of FIG. 10.
FIG. 13 is a vertical transverse sectional view taken on the line 13—13 of FIG. 10.

Carried upon the inner end portion of the connector head 64 on the right hand portion of handlebar T, as viewed in FIG. 10, is a disc 68 from the inwardly directed face of which projects a boss 69, radially outwardly of the proximate shaft 65, to which boss 69 is engaged one end of a push-pull cable 70. Push-pull cable 70, which functionally and structurally is identical with cable 16 above described, progresses forwardly through a slot-like aperture 71 formed in handlebars T for extension through a sleeve 72 held in a depending flange 73 formed at the forward end of the upper arm 74 of a bracket clamp 75. Said clamp 75 structurally embraces the related handlebar portion and embodies a relatively shorter, lower arm 76 secured to upper arm 74 by means of a pair of screws 77.

From the above it will be manifest that push-pull cable 70 may be effectively manipulated for causing engagement with the particular chainwheel of the rear chainwheel assembly through appropriate angular movement of sleeve 51 to bring about the intended gear condition.

Carried upon the inner end portion of connector head 64 within the left hand side of handlebars T, as viewed in FIG. 10, is a disc 78 from the inwardly directed face of which projects a pin 79, radially outwardly of the related shaft 65, about which is engaged the inner end of a spring link 80. Said spring link 80 extends forwardly through a slot-like aperture 81 formed in the surrounding handlebar portion for engagement spacedly forwardly of handlebars T to one end of a push-pull or tension cable 82 which structurally and functionally is identical with cable 24 above described; which cable is suitably engaged at its rearward or opposite end for effecting shifting of the bicycle drive chain (not shown) between the two drive chainwheels of the front chainwheel assembly (not shown). Cable 82 is directed through a sleeve 83 rigid within a flange 84 depending from the upper arm 85 of a bracket clamp 86 disposed about the adjacent portion of handlebars T; said bracket 86 having a lower arm 87 secured to upper arm 85 by a pair of screws 88. Thus, suitable turning of the sleeve 51, which is engaged to disc 78, will cause the requisite operation of cable 82 to effect low gear or high gear condition in the front chainwheel assembly and with such conditions being stable by reason of the over-center spring character of link 80.

The systems shown in FIGS. 10 to 13 inclusive contain a most substantial portion of their mechanisms within handlebars T and, thus, are disposed in a relatively protected state promoting longevity of durable usage.

Figures 14, 15:
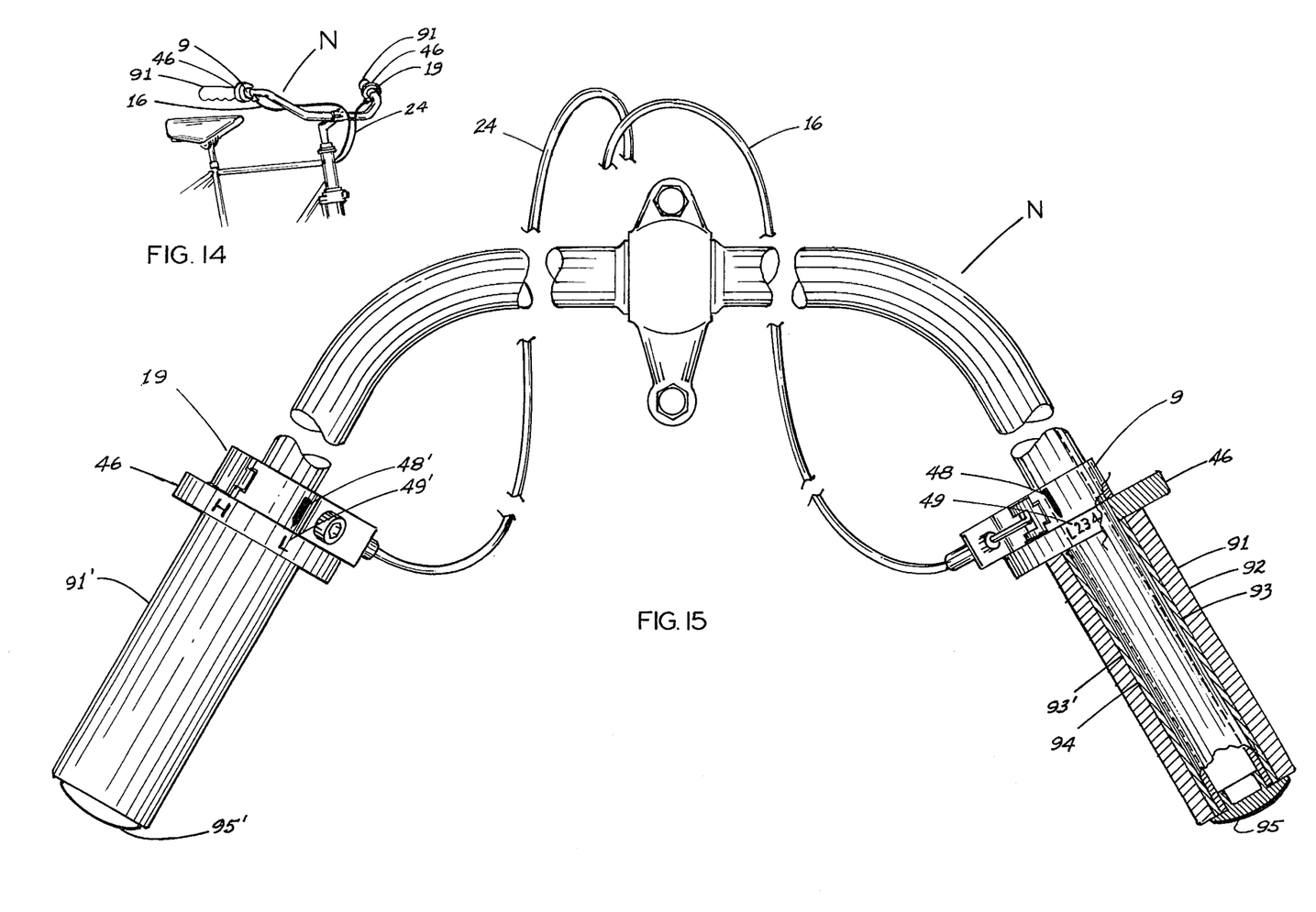
FIG. 14 is a fragmentary perspective view of a bicycle having mounted thereof a still further form of gear shifting system construction in accordance with and embodying the present invention.
FIG. 15 is an enlarged top plan view, in partial section, of the system illustrated in FIG. 14.

Referring now to FIGS. 14 and 15, a further form of gear shifting system incorporating the present invention is illustrated which embodies fundamentally like components as described hereinabove in conjunction with the modification shown in FIGS. 7, 8 and 9 so that like components will be accorded the same reference letter or numeral, as the case may be, for facilitating comprehension. However, the signal distinction between the embodiment shown in FIGS. 14 and 15 and that disclosed in FIGS. 7, 8 and 9 resides in the provision of short torsion sleeves serving both as cushion grips and hand grips which are engaged about the end portions of the handlebars as indicated at N, which are of the general touring configuration as may best be seen in FIG. 14. Thus, handlebars N, as is evident from the foregoing, do not comprehend the "drop" formation of the racing style.

Sleeves 91, 91' are of composite character, as comprising a tubular member 92 of limited length commensurate to that of the conventional hand grips and are disposed at, and engaged on, the end portions of said handlebars N. Tubular member 92 is disposed upon cooperating components 93, 93' of a split-sleeve bearing 94 tightly engaging handlebars N. Each bearing 94 at its inner end is respectively integrally formed with a disc 46, which latter are operatively interconnected with push-pull cables 16 and 24 in the manner hereinabove described with respect to the embodiments shown in FIGS. 1 to 6 inclusive. The obvious exception is the fact that the associated clamps 9 and 19 are expectedly so located that the related control cables 16, 24 are of relatively greater length to appropriately traverse the intervening distance in order to be led forwardly and thence downwardly of the central portion of handlebars N. By reason of such positioning, the relative location of the markers 48, 48' on said clamps 9, 19 respectively, are necessarily repositioned together with the cooperating graduate markings 49, 49'.

Sleeves 91, 91' may be suitably provided with end caps 95, 95' for engaging the end extremities of handlebars N and also serving to inhibit any unexpected tendency of sleeves 91, 91' to shift endwise of handlebars N.

Therefore, the foregoing merely reveals the further versatility of the present invention by disclosing its ready adaptability to bicycle handlebars of the touring character with permitting of sensitive control of the gears by a mere twisting or rotative movement of either or both of said handle-grip type sleeves 91, 91', as the case may be.

Referring now to FIGS. 16 to 21 inclusive, S generally designates an easily operable system for effecting vertical adjustment of the associated handlebars as indicated at K during operation of the bicycle. Thus, although as will become evident from the following, system S may be used with any type handlebars, the same is of especial application wherein the handlebars K are of racing character, since heretofore it has been difficult for riders using such handlebars to maintain the necessary level of alertness while traveling in areas of heavy traffic. To the present time, adjustment of the height of the handlebars has been a time consuming operation which can only be effected when the bicycle is in a state of disuse and with the application of suitable tools for effecting loosening and consequent tightening of the retention bolts. A more recent effort has comprehended pivotally mounting an arm upon the bicycle stem to allow a rocking movement of the handlebars, but such expedient also necessitates requisite adjustment while the bicycle is stationary. It should be understood that handlebars K are similar to handlebars H and M hereinabove described, being of a so-called "drop" configuration. Reference 101 indicates a conventional bicycle head tube provided at the upper and lower ends with the standard bearing cups 102, 102' providing the outer races for ball bearings 103, 103' respectively. The lower ball bearing 103' engages a stationary bottom, inner race-forming member 104 carried upon a fork tube 105 disposed within head tube 101 and being coaxial therewith. Upper bearing 103 engages the inner race-forming portion of an adjusting cone 106 threadedly secured upon external threading of fork tube 105.

Figure 16:
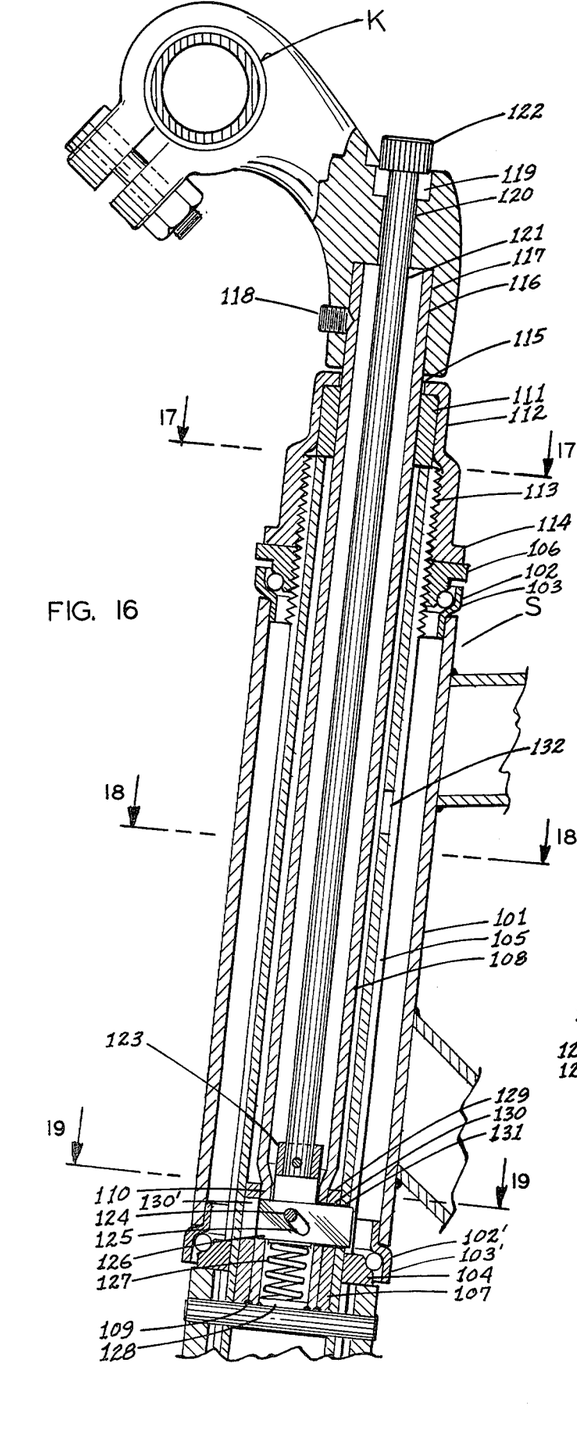
FIG. 16 is a vertical transverse sectional view of the stem of a bicycle incorporating a system for elevating same constructed in accordance with and embodying the present invention; showing the latch in lower, locked condition.
Figure 17:
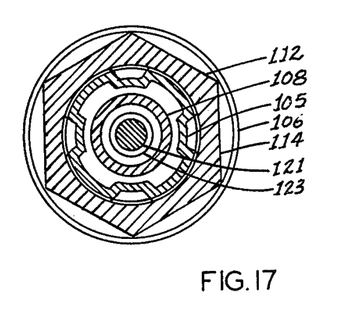
FIG. 17 is a horizontal transverse sectional view taken on the line 17—17 of FIG. 16.
Figure 18:
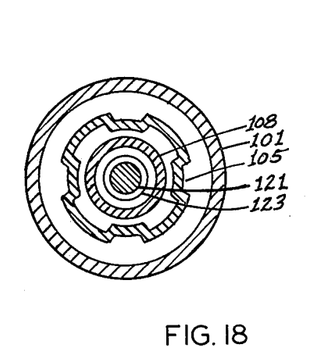
FIG. 18 is a horizontal transverse sectional view taken on the line 18—18 of FIG. 16.
Figure 19:
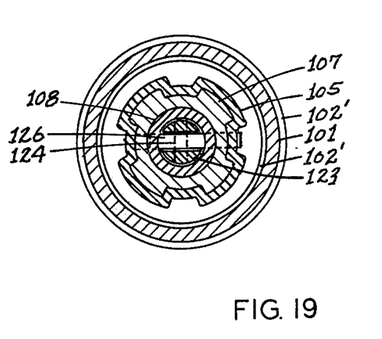
FIG. 19 is a horizontal transverse sectional view taken on the line 19—19 of FIG. 17.

Fork tube 105 is formed into 4-splined configuration, as may best be seen in FIGS. 17, 18 and 19, for internally receiving a relatively short sliding head 107 which is also of tubular character, but externally contoured complementarily to fork tube 105 to inhibit relative rotation therebetween. Sliding head 107 surrounds the lower end of a sliding stem tube 108 to which it is rigidly secured, as by welding, indicated at 109. Said sliding stem tube 108 is of relatively reduced diameter with respect to fork tube 105, but is in coaxial relationship therewith. As may best be seen in FIG. 16, sliding stem tube 108 is diametrally reduced in its lower end portion, as at 110, to provide a volume for snugly receiving sliding head 107 between same and fork tube 105. As will be seen, for reasons more fully apparent hereinbelow, sliding stem tube 108 and sliding head 107 are adapted for relative axial movement with respect to fork tube 105, as the latter is suitably secured at its lower end and with its upper end abutting a sleeve bearing 111 disposed within the upper end portion of a head tube lock nut 112 threadedly secured upon the upper end portion of fork tube 105, as at 113, and further having a bottom flange 114 in abutting relationship upon its under surface with the upper end face of adjusting cone 106.

Sliding stem tube 108 extends upwardly for projection through an opening 115 formed in the upper end face of lock nut 112 for extension therebeyond and into a downwardly opening recess 116 formed in a stem head 117. Stem tube 108 and stem head 117 are interengaged as by means of a set screw 118; it being noted that sleeve bearing 111 serves as a guide for stem tube 108, as well as for protecting the plated surface thereof.

Stem head 117 is provided in its upper end with an upwardly opening recess 119 communicating with recess 116 by means of an elongated passage 120 being of such diameter for extension therethrough of a control rod 121 which, at its upper end, projects through recess 119 and is enlarged to define a button 122 being of slightly less diameter than recess 119 for movement thereinto for reasons to be discussed hereinbelow. Control rod 121 progresses downwardly within sliding stem tube 108 also in coaxial relationship to head tube 101 and at its lower end carries a bifurcated support 123 for a cross-pin 124 which extends through a cam-defining opening 125 provided in a latch arm 126. The lower end of support 123 abuts against the upper end of a compression spring 127, the lower end of which bears against a base plate 128 fixed at the lower end of sliding stem tube 108 and extending transversely thereacross. Cam-defining opening 125 is of general slot-like character with its axis being inclined to the vertical and forming an angle of less than 90° with the major axis of latch arm 126. By reason of the bias of spring 127, latch arm 126 would be normally urged upwardly causing cross-pin 124 to be disposed in the lower end of said opening 125 (see FIG. 20). The differential between the cross-section of cross-pin 124 and the size and extent of cam-defining opening 125 permits of relative movement between said cross-pin 124 and said latch arm 126.

Provided in sliding stem tube 108 in its lower, constricted portion, are diametrally aligned openings 129, 129' for movement therethrough of latch arm 126; there being openings 130, 130' formed in sliding head 107 in alignment with stem tube openings 129, 129' respectively; said openings 130, 130' and 129, 129' being of like extent. Fork tube 105 is provided with lower and upper vertically aligned latch openings 131, 132, respectively. The distance between said latch openings 131, 132 determines the lift stroke of control rod 121 and hence the limits of vertical adjustability of handlebars K. This distance may be of any preselected extent but it has been found that a lift stroke of approximately 3½ inches is generally most suitable.

Figures 20, 21:
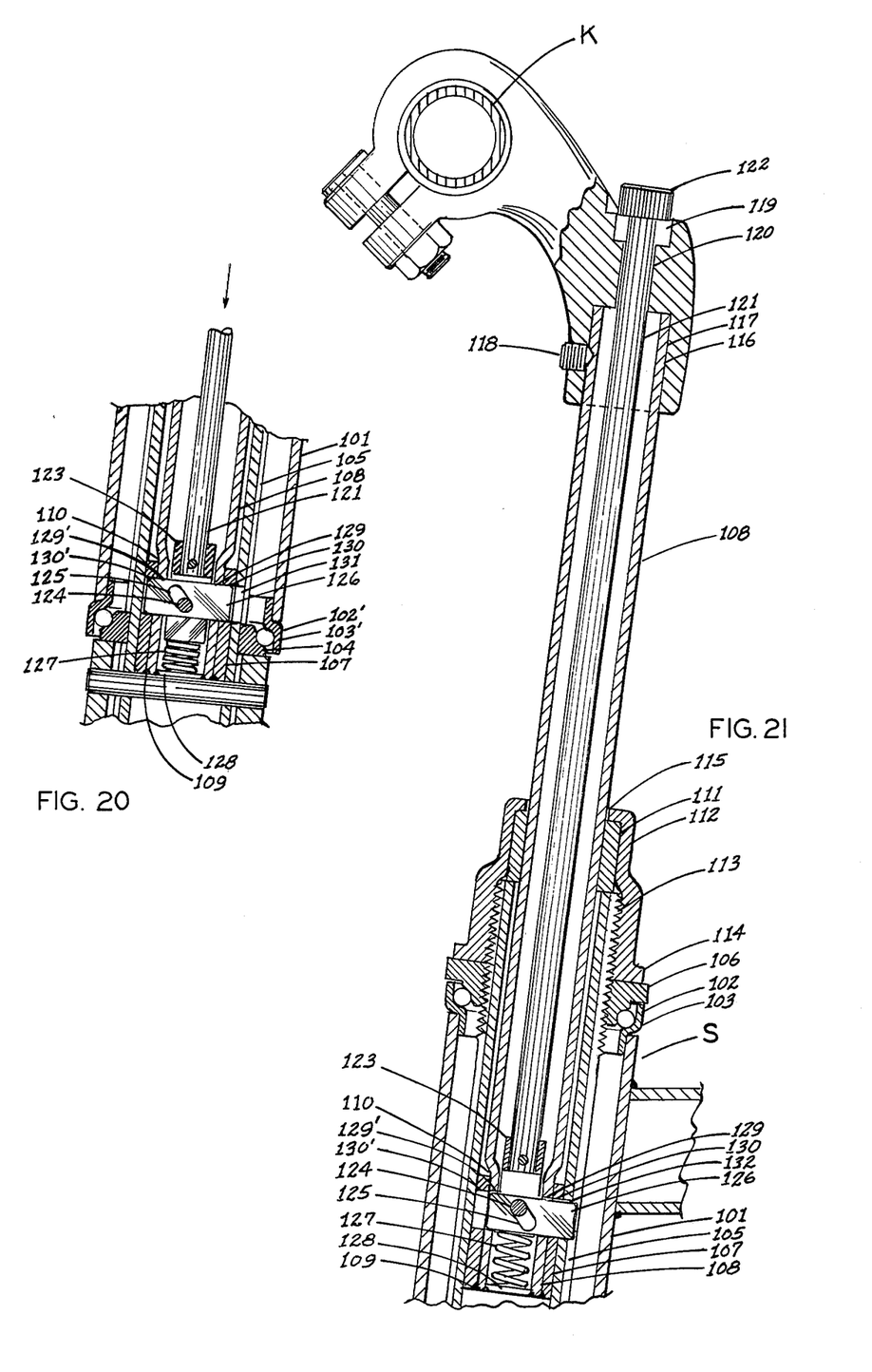
FIG. 20 is a fragmentary vertical transverse sectional view illustrating the latch in lower, unlocked condition.
FIG. 21 is a fragmentary vertical transverse sectional view showing the latch in upper, locked condition.

The operation of system S is as follows: with stem head 117 in lowered position, as shown in FIG. 16, latch arm 126 will project in one end portion through registering openings 129, 130 and into locking engagement within lower latch opening 131. In this condition, cross-pin 124 will be at the upper end of cam opening 125 and with spring 127 in substantially unstressed state. In order to elevate stem head 117, the rider will press downwardly on button 122, with the same thus moving into recess 119 and causing support 123 to move downwardly effecting stressing of spring 127 but with such movement causing cross-pin 124 to travel relatively downwardly and laterally within cam opening 125, thereby bringing about withdrawal of latch arm 126 from latch opening 131. Thus, cross-pin 124 will now be located at the lower end of cam opening 125 but with latch arm 126 removed from engagement with fork tube 105, thereby freeing stem tube 108 for vertical travel relative to head tube 101. Reference is made to FIG. 20 as illustrating latch arm 126 in unlocked condition with respect to latch opening 131.

The rider then releases button 122 and raises stem tube 108, as by lifting upwardly on handlebars K which causes stem tube 108 together with control rod 121 and the engaged latch arm 126, to be moved upwardly until latch arm 126 is in registration with fork tube upper opening 132. By means of the co-action of cross-pin 124 and cam opening 125 under release of spring 127, latch arm 126 will move laterally outwardly into locking engagement within said upper latch opening 132 (see FIG. 21). Thus it will be seen that in effecting vertical travel of cross-pin 124 between spring stressed and spring unstressed conditions, a horizontal or lateral component of travel is imparted to latch arm 126.

It is manifest that in returning stem 108 to lowered condition, the rider will again depress button 122 for effecting stressing of spring 127, by downward movement of control rod 121, with removal of latch arm 126 from locked position within latch opening 132 whereupon handlebars K, together with stem head 117, stem tube 108 and control rod 121, may be lowered for restoring latch arm 126 to locked condition within fork tube lower latch opening 131.

From the foregoing it will be seen that handlebars K may be easily and efficaciously elevated during bicycling operation so that the rider will be comfortably enabled to view his surroundings for safe manipulation of his bicycle despite the fact that the handlebars are of customary racer, or drop-type, character. After negotiating any zone requiring especial concern, the rider can easily restore the handlebars to the lowered, customary condition. Accordingly, system S is a most simple one mechanically, having a paucity of durable, reliable inter-acting components and which may be operated without the utilization of some extrinsic tool and moreover, during bicycle travel.

Having described my invention, what I claim and desired to obtain by Letters Patent is:

1. For use with a bicycle having a frame incorporating a vertically presented head tube, a stem, and handlebars engaged to said stem, a handlebar height adjustment assembly comprising a vertically presented stem tube engaged in the upper portion thereof to said stem and projecting downwardly therefrom into said head tube and being of relatively reduced diameter and coaxially with respect thereto for axially reciprocal shiftable movement relative to said head tube, said stem having a passage communcating with the interior of said stem tube, a control rod extending downwardly through said stem passage into said stem tube, a fork tube fixed within said head tube in coaxial and surrounding relationship to said stem tube, said fork tube being of multi-splined configuration, a sliding head disposed inwardly of said head tube, said sliding head being rigid on the lower end portion of said stem tube and being contoured complementarily to the fork tube spline configuration for being matingly engageable therewith whereby relative rotative movement between said fork tube and said stem tube is inhibited, a cross pin carried on said control rod in its lower end portion, a latch arm having its longitudnal axis perpendicular to the axis of said cross pin carried on said pin by means of an opening in said arm through which the said pin extends, said latch arm extending transversely of said stem tube, and means for selectively engaging said latch arm through operation of said control rod with said fork tube for presenting and maintaining said handlebars in predetermined vertical relationship with respect to said head tube.

2. A handlebar height adjustment assembly as defined in claim 1 and further characterized by said latch arm opening being of elongate character, having its major axis at a angle of less than 90 degrees to the longitudinal axis of said latch arm, said cross pin having a cross section less than the length of said latch arm opening, resilient means disposed beneath said latch arm for urging same upwardly with respect to said cross pin, there being aligned openings provided in the sliding head and the stem tube for lengthwise shiftable movement therein of said latch arm between operative and inoperative movement with respect to said fork tube.

3. A handlebar height adjustment assembly as defined in claim 2 and further characterized by said means for selectively engaging said latch arm through operation of said control rod comprising at least a pair of vertically spaced apart apertures provided in said fork tube with the intervening distance being predetermined, said fork tube apertures being dimensioned for reception of said latch arm to maintain the stem tube in selected vertical adjustment, said latch arm being withdrawable from engaged condition within a fork tube aperture upon depression of said control rod whereby said cross pin is moved relatively downwardly within the associated latch arm opening in stressing said resilient means.

* * * * *